United States Patent [19]

Maurer et al.

[11] Patent Number: 5,213,393
[45] Date of Patent: May 25, 1993

[54] CHILD'S SAFETY SEAT

[75] Inventors: Petra Maurer, Henstedt-Ulzburg; Peter Schmidt, Glinde, both of Fed. Rep. of Germany

[73] Assignee: Autoflug GmbH & Co. Fahrzeugtechnik, Rellingen, Fed. Rep. of Germany

[21] Appl. No.: 764,338
[22] PCT Filed: Mar. 21, 1990
[86] PCT No.: PCT/DE90/00218
§ 371 Date: Nov. 22, 1991
§ 102(e) Date: Nov. 22, 1991
[87] PCT Pub. No.: WO90/11203
PCT Pub. Date: Oct. 4, 1990

[30] Foreign Application Priority Data

Mar. 23, 1989 [DE] Fed. Rep. of Germany ....... 3909650

[51] Int. Cl.$^5$ .............................................. A47C 1/08
[52] U.S. Cl. .................................. 297/250; 297/254; 297/188
[58] Field of Search ............... 297/250, 188, 183, 254, 297/255, 256, 471

[56] References Cited

U.S. PATENT DOCUMENTS

| | | | |
|---|---|---|---|
| 3,596,986 | 8/1971 | Ragsdale | 297/183 |
| 4,205,877 | 6/1980 | Ettridge | 297/250 X |
| 4,591,208 | 5/1986 | McDonald | 297/250 X |
| 4,681,368 | 7/1987 | Heath et al. | 297/250 |
| 4,826,246 | 5/1989 | Meeker | 297/250 |

FOREIGN PATENT DOCUMENTS

| | | | |
|---|---|---|---|
| 1937610 | 2/1971 | Fed. Rep. of Germany | 297/254 |
| 2417413 | 10/1979 | France | 297/471 |
| 644549 | 1/1989 | Japan | 297/250 |

Primary Examiner—Kenneth J. Dorner
Assistant Examiner—James M. Gardner
Attorney, Agent, or Firm—Robert W. Becker & Associates

[57] ABSTRACT

A child's safety seat to be fastened to a safety belt system of a motor vehicle, having a pelvic belt and a shoulder belt, is provided. The child's safety seat comprises an under frame and a seat shell. The under frame is to be fastened by the pelvic belt. The seat shell is provided with an integrated safety belt for securing the child in the safety seat. At the foot end of the seat shell an essentially vertically extending hoop is provided which is adapted to rest at the back rest of a vehicle seat. At the bottom portion of the hoop the under frame is engaged by the pelvic belt. The hoop is provided with a guide for the shoulder belt above the center of gravity of the seat shell.

8 Claims, 2 Drawing Sheets

CHILD'S SAFETY SEAT

BACKGROUND OF THE INVENTION

The invention relates to a child's safety seat to be anchored to a safety belt system of a motor vehicle, having a pelvic belt and a shoulder belt, that comprises an under frame to be held by the pelvic belt of the safety belt and a seat shell, connected to the under frame and having an integrated safety belt for securing the child, and further having an essentially vertically extending hoop connected to the foot end of the seat shell, which is adapted to rest at the back rest of the vehicle seat, whereby at the foot thereof the pelvic belt holds the under frame at the side which is facing the seat surface.

A child's safety seat of the aforementioned kind has been described in DE-GM 87 05 942. In the child's seat which is a one-piece combination of the under frame and the seat shell the rearward ends of the supports of the under frame, viewed in the direction of travel when the child's seat is placed in the car, are extended to form a vertically disposed hoop which rests against the back rest of the vehicle seat. The primary function of the hoop is to provide a rebound means.

At the transition between the supports and the hoop a guide for the pelvic belt is provided and the child's safety seat may be secured only by the pelvic belt. In as far as an additional securing by the shoulder belt of the safety belt system of the vehicle is desired the shoulder belt is guided about the outer circumference of the seat shell of the child's seat by a respective guide provided at the outside of the back rest of the seat shell. With this known arrangement the primary disadvantage is that the securing of the child's seat by using the shoulder belt of the safety belt system of the vehicle is cumbersome and the handling of the child's seat during its positioning in the vehicle or its removing from the vehicle is difficult.

It is therefore an object of the invention to improve a child's seat of the aforementioned kind such that the handling of the child's seat as well as of the respective portions of the safety belt during attaching and releasing of the safety belt system at the child's seat is improved and the safety of the restraint of the child's seat at the vehicle seat is increased.

SUMMARY OF THE INVENTION

The solution of this problem inclusive advantageous embodiments and developments may be taken from the contents of the claims which are appended to the present description.

The invention, in its basic concept, provides a guide for the shoulder belt which is disposed at the hoop above the center of gravity of the seat shell. This provides the advantage that due to the holding respectively guide means for the pelvic belt as well as for the shoulder belt of the safety belt system provided at the foot end of the child's safety seat and positioned one above the other, the geometry of the safety belt during restraining of the child's safety seat corresponds to the geometry of the belt when a person, in an upright position, is buckled up in the vehicle. In so far the positioning as well as the removal of the safety belt during placement and removal of the child's safety seat is simplified. Furthermore, it is advantageous that only a small amount of the belt length is required for holding the child's safety seat at the vehicle seat so that the belts provided at the vehicle with their respective length are sufficient for holding the child's safety seat. Since the center of gravity of the shoulder belt guide lies above the center of gravity of the seat shell, preferably above the center of gravity of the entity comprised of the seat shell with the child during transport of the child, acceleration forces acting on the child's safety seat will not result in a tilting movement of the child's safety seat about its belt connection. A further advantage is viewed in the fact that due to the belt guides provided at the hoop for the pelvic belt as well as the shoulder belt, the seat shell is free of overlying respectively crossing portions of the seat belt system so that a good access to the seat shell with respect to the transport of a child is provided.

In a preferred embodiment of the invention the guide for the shoulder belt is spaced at a distance from the vertically extending hoop which extends approximately at a right angle from the base frame of the under frame so that a respective advantageous belt tension and belt geometry in adaptation to various vehicle geometries will result.

In another preferred embodiment of the invention it is provided that the distance between the shoulder belt guide and the hoop is achieved such that a box is connected to the hoop whereby the shoulder belt guide is disposed in an expedient manner at the side of the box which is facing the seat shell. This box provides a surface for depositing things and an additional compartment for storing utensils so that the handling of the child's seat is further improved.

The invention is concerned with providing a securing of a one-piece child's safety seat comprising an under frame and a seat shell with the inventive safety belt guide at the hoop.

The invention is further concerned with providing a child's safety seat in which the seat shell may be removable from the under frame whereby for the connection of the under frame to the seat shell a locking device is provided. The hoop for holding the pelvic belt as well as the shoulder belt is an integral part of the under frame, so that the under frame may be first secured in the vehicle via the safety belt where it may remain permanently so that only the seat shell must be removed from the vehicle respectively must be placed into the vehicle in order to be locked to the under frame.

The invention is further concerned with securing the seat shell to the vehicle without requiring the under frame. In this embodiment the seat shell is secured to the vehicle seat by combining the pelvic belt as well as the shoulder belt to one belt section and guiding this belt section through the carrying handles provided at the seat shell and thereby securing the seat shell to the vehicle seat whereby the center of gravity of the seat shell with the child sitting therein is below the safety belt section so that there is no danger of tilting of the seat shell in the case of acceleration forces acting on the seat shell.

BRIEF DESCRIPTION OF THE DRAWINGS

In the drawing an embodiment of the present invention is represented which will be described in the following paragraphs. It is shown in.

DESCRIPTION OF PREFERRED EMBODIMENT

Figure 1:
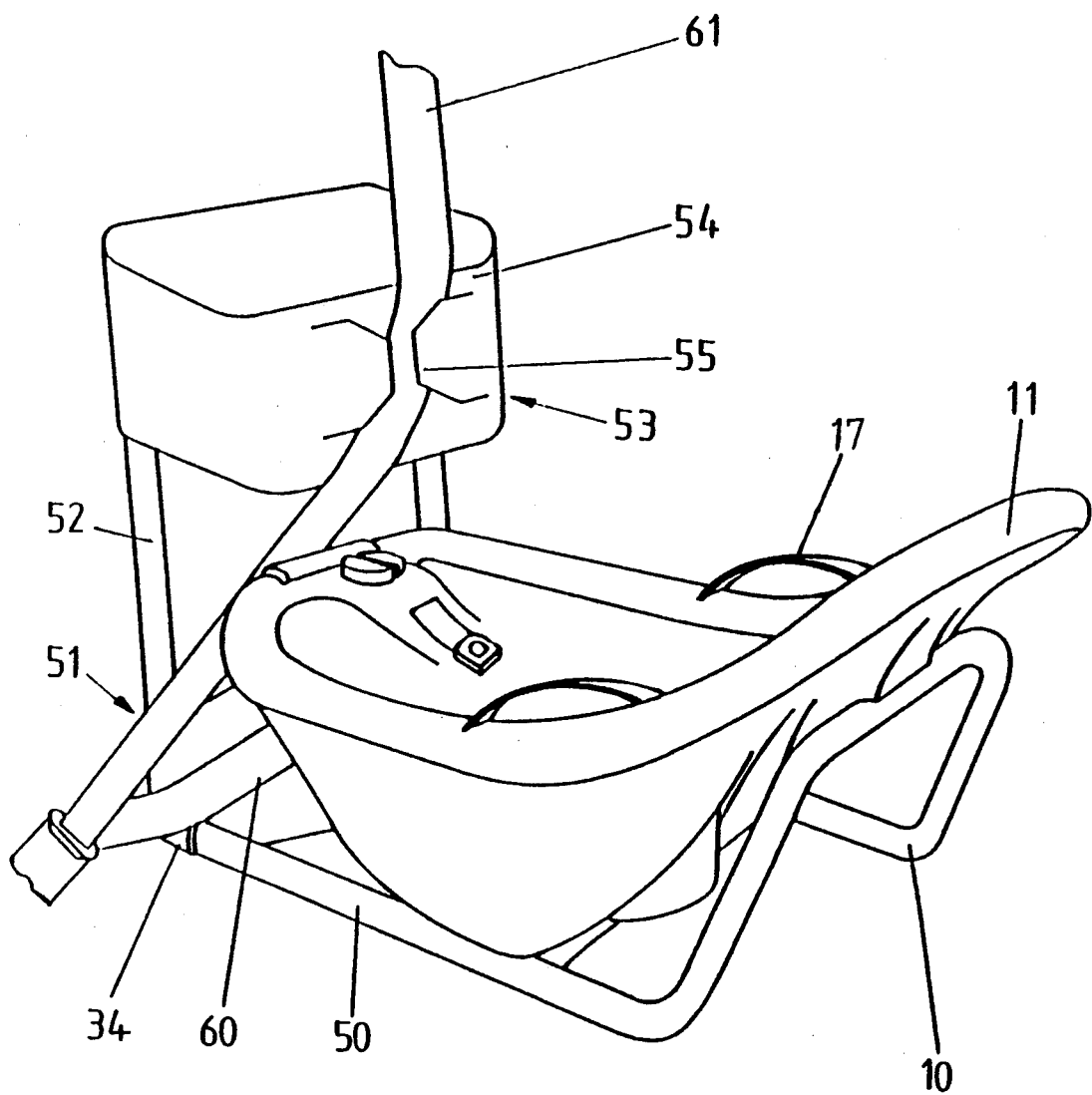
FIG. 1 a child's safety seat with an under frame and a seat shell in a perspective representation.

According to FIG. 1 the under frame 10 of a child's safety seat is provided with a base frame 50 from which, in the area of the bottom portion 51, extends in a vertically upwardly direction a hoop 52 for guiding the portions of the safety belt. The hoop 52 extends essentially parallel to the back rest of the vehicle seat which is not represented. While the pelvic belt section 60 of the vehicle safety belt system is inserted into a holding means 34 provided at a side of the base frame 51 respectively at the hoop 52 facing the vehicle seat, the hoop 52, above the center of gravity of the seat shell 11, is provided with a guide 53 for receiving the shoulder belt section 61 of the vehicle safety belt system. The guide 53 is spaced at a distance from the hoop 52 by an amount B whereby the distance is created by interposing a box 54. The box 54 is provided with flaps 55 at its side facing the seat shell for receiving the shoulder belt section 61. The box 54 may simply serve as a surface for depositing things or may be provided as a closable container into which utensils necessary for attending the child are positioned.

With the above described arrangement the placement of the vehicle safety belt is substantially facilitated relative to known child's safety seats with which the shoulder belt must be inserted into respective special guide means provided at the backrest of the seat shell.

Figure 2:
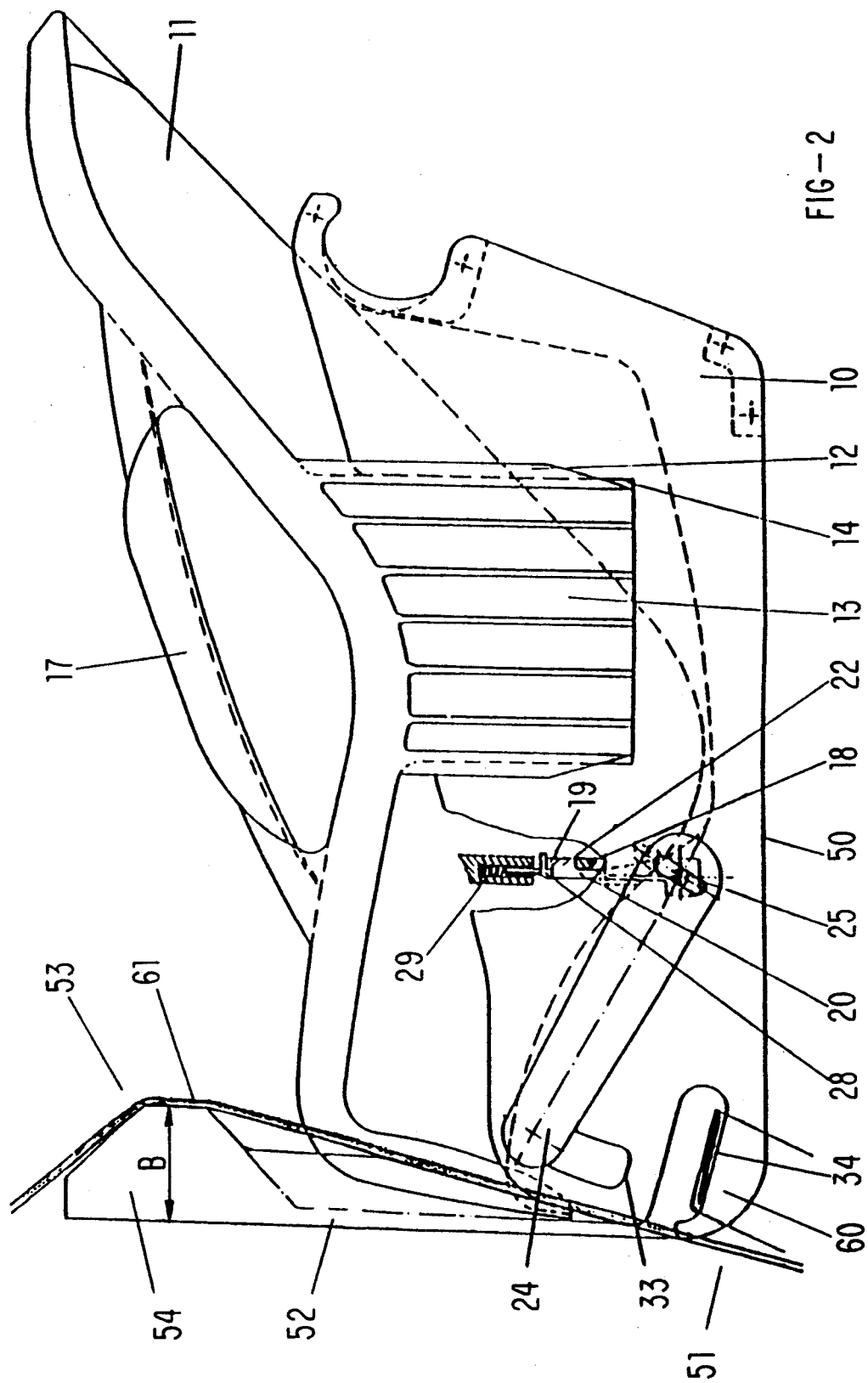
FIG. 2 a child's safety seat with an under frame and a removably disposed seat shell in a side view.

FIG. 2 describes an embodiment of the invention in which the seat shell 11 is removable from the under frame 10 and is securable thereto via a locking device. The under frame 10 is provided with lateral projections 12 for centering the seat shell 11 during the insertion whereby the seat shell 11 with side plates 13 engages a guide means 14 of the under frame 10. The seat shell 11 is further provided with its own safety belt with a belt buckle and laterally disposed carrying handles 17.

In a symmetric arrangement, a locking device for locking the seat shell 11 to the under frame 10 is provided at both sides of the seat shell 11 respectively of the under frame 10, which is embodied according to the following description.

A tongue-like holder 18 with a locking recess 19 is connected to the seat shell 11 and is immersed into a locking means provided at the under frame 10. The locking means comprises a rotatably supported latch 20 at the under frame 10 having a locking projection 22. The latch 20, when the seat shell 11 is placed on the under frame 10, engages the locking recess 19 of the holder 18 connected to the seat shell 11. The latch 20 is loaded into its locking position by a spring.

At the under frame 10 a pivotable actuating lever 24 is provided which acts on the latch 20 with a catch 25. The lever 24 is loaded into its rest position and arranged such that when pivoted to rest at an abutment 33 it will remove the latch 20 via the catch 25 from its engagement at the locking recess 19 of the holder 18. Since both sides of the seat shell 11 respectively of the under frame 10 are provided with an actuating lever 24, the two levers 24 are connected by a transverse stay so that the actuation of only one lever 24 effects the required unlocking of the locking device on both sides of the seat 10, 11.

In order to secure the locking position of the latch 20 in the holder 18, the holder 18 is provided with a securing slide 28 which is loaded into a lower rest position by a spring 29 whereby the spring 29 is supported at the seat shell 11. The slide 28 is guided by a cross piece which engages the locking recess 19 and is provided with a head piece that extends from the holder 18 in the direction towards the latch 20 of the under frame 10. FIG. 2 represents the upper end position wherein the head piece of the slide 28 rests at the latch 20 and thus secures it in the locking position.

Due to the locking device which has been described in the above paragraphs in detail the locking of the seat shell 11 at the under frame 10 is automatically achieved when the seat shell 11 is placed on the under frame 10. For the removal of the seat shell 11 from the under frame 10 an actuation of the locking device via one or both of the levers 24 is required which unlocks the locking device so that the seat shell 11 may be subsequently removed from the under frame 10.

As can be seen from the drawing the seat shell 11 may be secured to the vehicle without requiring the presence of the under frame 10 by combining the pelvic belt section 60 and the shoulder belt section 61 to a single belt section and inserting the belt section through the carrying handles 17 of the seat shell 11 so that the belt section comprised of the pelvic belt 60 and the shoulder belt 61 is placed over the seat shell 11 and is securely held at the vehicle seat. This also provides an especially simple and secure handling of the seat shell 11 within the vehicle.

The disclosed features of the invention as described in the above description, the claims, the abstract and the drawings are essential individually or in any desired combination for the realization of the present invention in its different embodiments.

The present invention is, of course, in no way restricted to the specific disclosure of the specification and drawings, but also encompasses any modifications within the scope of the appended claims.

What we claim is:

1. A child's safety seat to be fastened to a safety belt system of a motor vehicle having a pelvic belt and a shoulder belt, said child's safety seat comprising:
   an under frame to be fastened by the pelvic belt;
   a seat shell connected to said under frame, said seat shell comprising a foot rest end and a back rest end an integrated safety belt for securing a child;
   an essentially vertically extending hoop arranged at rest foot said end of said seat shell, said hoop being adapted to rest at a back rest of a vehicle seat, and at a bottom area of said hoop the pelvic belt fastens said under frame at a side thereof that is facing the vehicle seat; and
   a guide for the shoulder belt, connected at said hoop at a position that is above a center of gravity of said seat shell and said guide is located above said foot rest end.

2. A child's safety seat according to claim 1, wherein said guide for the shoulder belt is spaced at a distance from said hoop in a direction towards said seat shell.

3. A child's safety seat according to claim 1, wherein said guide for the shoulder belt is provided at side of a box that is connected to an upper portion of said hoop, said side of said box facing said seat shell.

4. A child's safety seat according to claim 3, wherein said guide for the shoulder belt is in the form of flaps formed at said side of said box.

5. A child's safety seat according to claim 1, wherein said seat shell and said under frame are formed as one piece.

6. A child's safety seat according to claim 1, wherein said seat shell is releasable from said under frame and is securable to said under frame by a locking device.

7. A child's safety seat according to claim 1, wherein said seat shell is provided with carrying handles on longitudinal sides thereof, said carrying handles providing a guiding means for a belt section formed by combining the pelvic belt and the shoulder belt.

8. A child's safety seat to be fastened to a safety belt system of a motor vehicle having a pelvic belt and a shoulder belt, said child's safety seat comprising:
- an under frame to be fastened by the pelvic belt;
- a seat shell connected to said under frame, said seat shell comprising a foot rest end and a back rest end an integrated safety belt for securing a child;
- an essentially vertically extending hoop arranged at said foot rest end of said seat shell, said hoop being adapted to rest at a back rest of a vehicle seat so that the child is seated counter to the driving direction of the motor vehicle, and at a bottom area of said hoop the pelvic belt fastens said under frame at a side thereof that is facing the vehicle seat; and
- a component connected to said hoop at a position that is above a center of gravity of said seat shell, said component comprising a guide of the shoulder belt, said guide connected to said component spaced at a distance from said hoop in a direction toward said seat shell and said guide is located above said foot rest end.

* * * * *